INVENTOR.
MORRIS WEISS
BY
ATTORNEY

Nov. 15, 1966 M. WEISS 3,285,069
INSTRUMENT FOR MEASURING TEMPERATURE OF EXTENDED SURFACES
Filed March 12, 1965 2 Sheets-Sheet 2
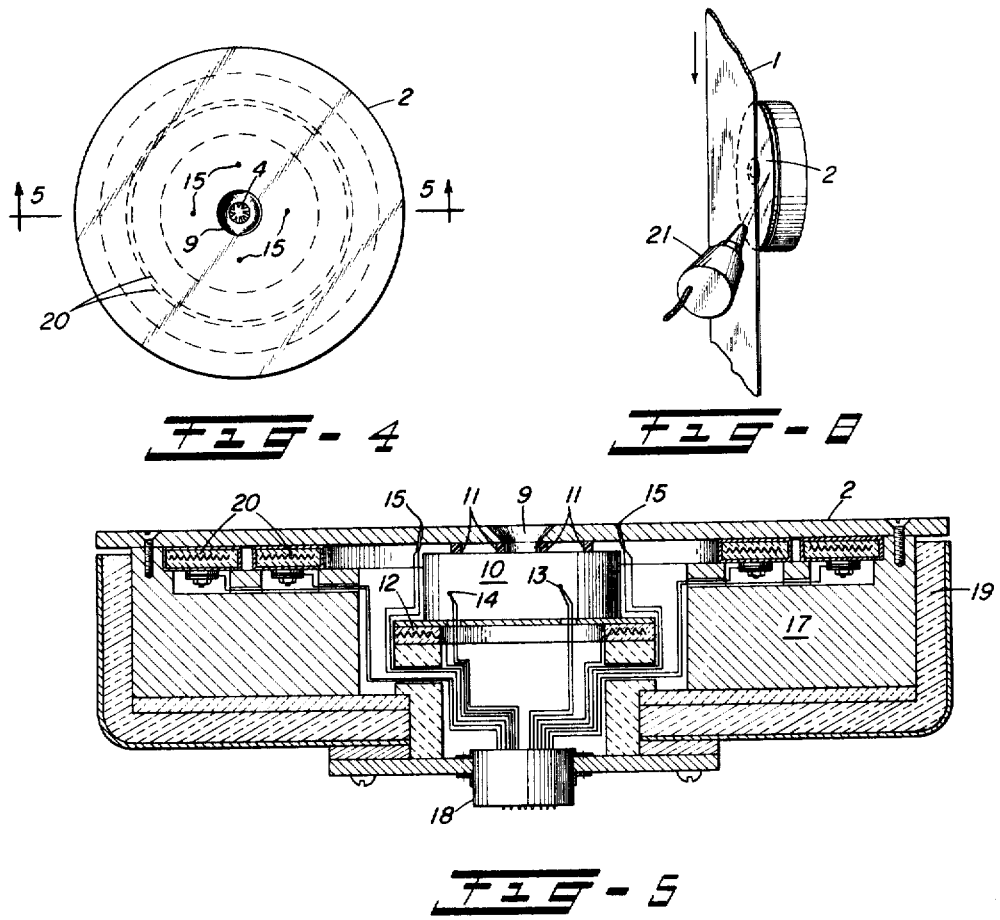
INVENTOR.
MORRIS WEISS
BY
ATTORNEY

United States Patent Office 3,285,069
Patented Nov. 15, 1966

3,285,069
INSTRUMENT FOR MEASURING TEMPERATURE OF EXTENDED SURFACES
Morris Weiss, Stamford, Conn., assignor to Barnes Engineering Company, Stamford, Conn., a corporation of Delaware
Filed Mar. 12, 1965, Ser. No. 444,899
2 Claims. (Cl. 73—355)

This invention relates to an instrument for the accurate and continuous determination of the temperature of an extended surface regardless of the emissivity of the surface, and this application is in part a continuation of my prior application Serial No. 39,361 filed June 28, 1960, and now abandoned.

The determination of temperature by direct contact is a problem because temperature measuring instruments requiring contact with a hot surface and particularly a hot surface which is moving, such as a strip of steel, tinplate and the like, ordinarily cannot be used as it may damage the surface or the temperature probe deteriorates. As a result, various pyrometers have been designed which determine the temperature by radiation from the surface, usually in the infrared, although in the case of very high temperatures optical pyrometers operating in the visible spectrum have also been used. This type of instrument overcomes the difficulty presented by contact with the surface. However, other difficulties arise. In the first place, the pyrometer either requires mental judgment as by color comparison in optical pyrometers in the visible range, or by some measurement of the radiation, either the total radiation or radiation in a particular band. This type of measurement is completely at the mercy of changes of emissivity of the surface because the amount of radiation from a hot surface at a particular temperature varies with the emissivity. Unfortunately, there are many operations, such as the hot rolling of tinplate, processing of plastic films at elevated temperatures, and the like, which may involve variations in the surface, for example by oxidation or other means which change the emissivity as the surface moves past the pyrometer. As a result, the pyrometer which measures the radiation will give inaccurate readings.

The present invention solves the problem presented by emissivity by a particular type of comparison instrument. An extended surface close to but not touching the surface to be measured is provided with a surface which is maintained at or very near the desired temperature for the surface to be measured. A suitable differential radiation detector, such as, for example, a thermopile, is provided in a more or less centrally located portion of the surface. The differential detector measures the difference between the reference surface temperature and the temperature produced by radiation which will be described in more detail below. The invention is not limited to the use of a thermopile as a differential temperature detector, but any other known differential radiation detector may be used. Thermopiles present many practical advantages and are therefore preferred, and for the rest of the present specification the invention will be described in conjunction with a thermopile, it being understood that the invention is not limited thereto and that this preferred form of detector is described as a typical illustrative example.

A number of problems arise. First of all, the reference surface must be extended with relation to the relatively small spacing from the surface whose temperature is to be measured, the extension being sufficient so that the active junctions of the differential detector do not see any radiation which arises from outside the reference surface either by reflection of such radiation from the material of which the temperature is to be measured, or from the reference surface, or both.

It has been proposed to use a broad principle of radiation balance between two surfaces which are close together. When two surfaces are the same temperature, a complete radiation balance is obtained, regardless of emissivity of the material to be measured or the radiation surface. If there is any difference in temperature between the surfaces, the differential radiation detector will put out a signal the polarity of which indicates in what direction the temperature of the surface to be measured has varied. This signal is processed in conventional electronic circuits, which normally include amplification, and produce an output signal which can be used for any purpose desired, either to indicate temperature, to control the temperature of the material to be measured, or both. In other words, the measurement really ceases with the output of a signal from the radiation detector.

While an extended reference surface is an essesntial feature of the present invention, it is only one necessary feature, and does not constitute the only distinction from what has been described before. Essentially the prior art proposals are represented by two patents, Gray 2,611,541 and Harrison 2,758,860. The Gray patent provides for a plate which is maintained at a predetermined temperature and which is closely adjacent to a moving sheet of the material the temperature of which is to be measured. In other words, the Gray patent shows the use of an extended reference surface generally. Gray provides for a total radiation pryometer which views the space between the reference plate and the material to be measured at an angle from a point near one edge of the plate. The pyrometer is a total radiation pyrometer, and comparison is made outside of the measuring portion of the instrument with an external standard.

The Harrison patent described a differential radiation detector at the bottom of a cavity which is in the form of a modified cone optic. The radiation detector is not near the surface to be measured, and is referenced not to the temperature of a reference surface but to the upper part of a thick block.

A serious problem is presented when there is any possibility of flow of air between the material to be measured and the reference surface. For example, if they are arranged vertically, a chimney effect results and the surface of the reference plate bears but little relation, and no fixed relation to the temperature of the plate. This introduces a second feature of the present invention which is vitally important for accurate measurements. This second feature is that in the differential radiation detector, the thermopile, the reference junctions of the thermopile are maintained at the temperature not of the reference plate itself but of its surface. This is effected in various ways. Under very favorable circumstances where the moving material to be measured is horizontal, which sometimes occurs in the plastic industry, it is possible to use a thin reference plate and this simple solution of the problem of maintaining the reference junctions of the thermopile at reference plate surface temperature is simplified because the temperature of the thin plate remains uniform under these favorable circumstances. Where more severe problems of surface temperature variations are encountered, more complex methods of assuring that the differential detector is at reference plate surface temperature will be described. In every case, however, it is vitally essential to accurate measurement and is an important and one of the essential features of the present invention that the differential detector is referenced to surface temperature and not to some temperature in the reference plate which is not surface temperature.

While it is possible, because of the extreme accuracy of the differential detector, to operate with reference surfaces of quite low emissivities, it is preferred to use surfaces of relatively high emissivity. However, it is not essential that the surface be substantially a black body, even though such a surface operates with great efficiency. The multiple reflections resulting from the wide extent of the reference surface and the relatively close spacing from the material to be measured, permits operating with reference surfaces which are not completely black and which have emissivities substantially below 1.0. However, the reference surface is preferably one with an emissivity that is relatively high compared at least with the average emissivity of the material to be measured.

Reference has been made to a relatively great extent of the reference surface. This is a relative factor compared to the spacing between surface and material to be measured, because of course theoretically, the dimensions of the reference surface are at least an order of magnitude greater than the spacing. Practical instruments will normally use, in commercial operation, spaces which do not greatly exceed an inch. In such cases, reference surfaces having dimensions of the order of a foot or somewhat more may be employed. The invention is not intended to be limited to exact figures, but the lower relative figure of an order of magnitude is necessary for practical instruments.

While it follows from optical laws, an effect which takes place in the instruments of the present invention merits very brief mention. The radiation balance between reference surface and material to be measured establishes itself instantaneously because the radiations move with the speed of light. Therefore, the measurement can follow instantly any sudden changes of emissivity, even in a very rapidly moving sheet of material to be measured. This is a practical advantage.

The invention will be described in greater detail in connection with the drawings which show in semi-diagrammatic form two typical modifications of the invention. In the drawings:

FIG. 4 is a plan view of a plate with a radiation detector thermally insulated therefrom;

FIG. 5 is a section along the line 5—5 of FIG. 4;

FIG. 6 is a schematic of detector capsule heater;

FIG. 7 is a schematic of the plate heater circuit; and

FIG. 8 shows a plate with radiometric surface temperature measurement.

Figure 1:
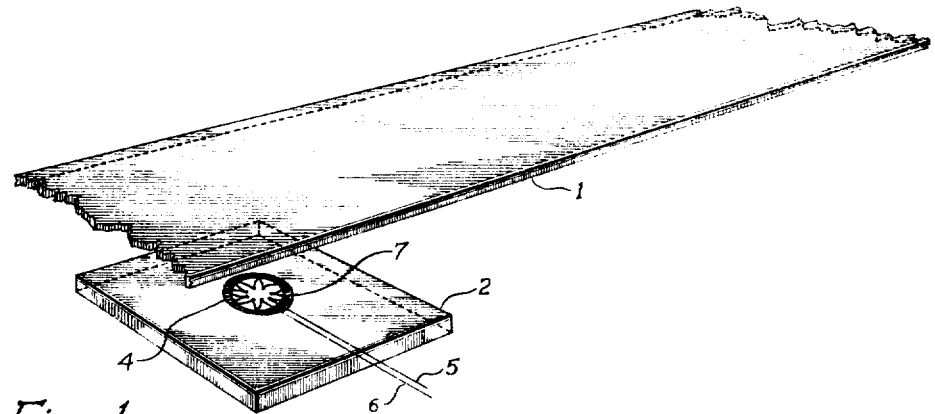
FIG. 1 is a semi-diagrammatic view of the measurement of substantially plane surfaces.

In FIG. 1 the surface of which the temperature is to be measured is shown at 1 and is shown partly broken away, as it is a part of a long moving strip such as a strip of hot rolled tinplate, plastic, or the like. The temperature control reference surface is shown at 2 and it will be seen that it is a relatively thin plate in comparison with its extent. Its temperature is maintained constant by heaters which are thermostatically controlled in the conventional manner. The thermostatic control is not shown. The spacing between strip and surface is shown somewhat exaggerated to permit clear illustration of the differential radiation detector, which is in the form of a thermopile with active junctions 4 and reference junctions 7 on a thin electrical insulator such as mica. The reference junctions of course are at the temperature of the surface of the plate. As has been pointed out above, the separation between the surfaces is small in comparison to the linear dimensions of the reference surface, and preferably, the latter are at least an order of magnitude greater than the former.

The output of the thermopile passes out through leads 5 and 6 which are connected respectively to the active and reference junctions. The reference junctions are not only in good thermal heat exchanging relation with the surface of the plate through the thin mica insulator, but they are also shielded from radiation which is shown in greater detail in FIG. 2, the shielding being shown partly broken away. The mica film which insulates the reference junctions from the surface of the plate should be thin enough to permit the reference junctions to achieve the temperature of the surface of the plate, but there is some limit on its thickness because if it is so thin that it has substantially zero thermal impedance, the sensitivity of the instrument may be somewhat reduced. The sensitivity, of course, is determined by the thermal impedance between the exposed and unexposed junctions. The path in the thermocouple elements themselves present a reasonable thermal impedance, as in all practical thermopiles because of the thinness of the materials forming the junctions in comparison to their small linear dimensions and to the substantial length of the paths which, though fairly short in absolute length, is very much larger than the other dimensions. It is an advantage of the present invention that standard commercial solid-backed thermopiles may be used in which the above properties obtain, as illustrated in the drawings. It is not necessary to design special new types of thermopiles for the present invention. If surfaces 1 and 2 are at the same temperatures, there is a radiation balance and both sets of junctions of the thermopile are at the same temperature. Accordingly, no voltage is developed in the leads 5 and 6. The output is processed in conventional circuits and can be applied to an ordinary zero-center direct current meter. The zero reading is in no wise affected by the emissivity of surface 1 or for that matter of the surface 2 of the plate, although the latter is preferably of an emissivity as high or substantially higher than that of surface 1. For example, if this surface has emissivity of 0.5, one half the radiant image striking the exposed thermocouple junctions is emitted from the surface and one half is reflected radiation from the surface 2. If the emissivity is .75, 75% of the radiation is emitted from the upper surface and 25% is reflected radiation from the reference surface 2. In each case the total radiation adds up to the same figure provided that the two surfaces are at the same temperature.

Figure 2:
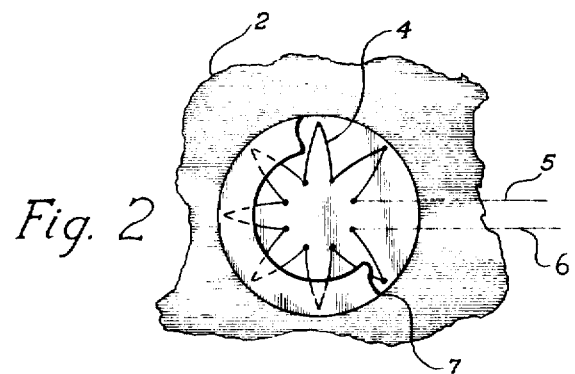
FIG. 2 is an enlarged detailed plan view of the differential radiation detector.
Figure 3:
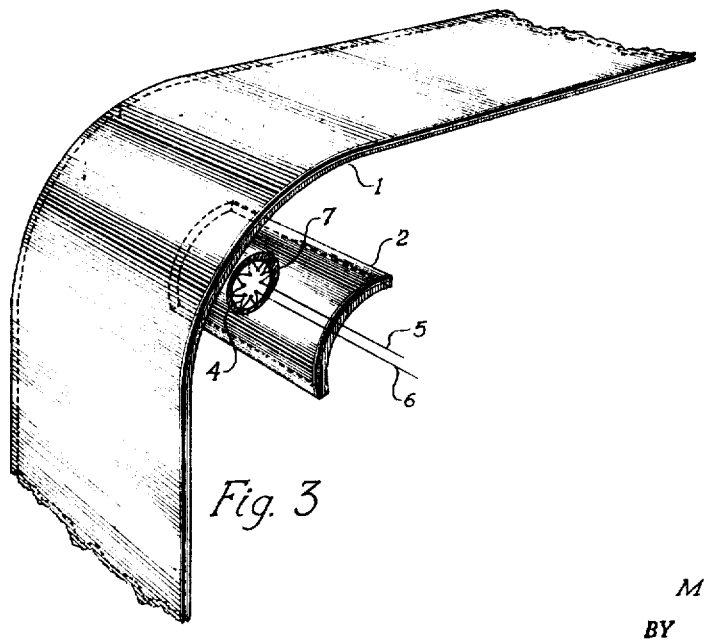
FIG. 3 is a diagrammatic representation of a different surface shape.

FIG. 3 illustrates diagrammatically the effect of curved surfaces. The same elements bear the same reference numbers as in FIGS. 1 and 2. It will be seen that the reference surface can be separated from the other surface by a distance which is a much bigger proportion of the linear dimensions of the reference surface than is the case in FIGS. 1 and 2 without permitting the detector to see any significant portion of other surfaces which would affect the accuracy of the detector's response. Theoretically, if the two surfaces were concentric spheres, the separation could be infinite without affecting the operation of the present invention. Of course, in practical installations much smaller separations of the two surfaces will be encountered because in most practical operations moving surfaces will be substantially flat. However, a consideration of the above discussion of FIG. 3 shows that so long as the detector does not see any substantial amount of surface other than the one, the temperature of which is to be compared, and the reference surface, the effects of the present invention are obtained. This leads to an important practical advantage. Moving surfaces such as hot rolled tinplate may not be always optically flat and the moving strip may whip somewhat so that portions of it are nearer the reference surface than others. This has absolutely no effect on the instrument, because so long as the radiation detector does not see any substantial amount of an outside surface, the reflections and emissions of the reference surface and the surface to be measured will set up immediately a radiation balance and this radiation balance is not affected by the distance between the surfaces. The insensitivity of the present instrument to departures from the flatness or to periodic small variations of the distance separating reference surface from the surface to be measured makes the instrument applicable for practical measurements without requiring any modification of the machinery producing the surface to be measured or its composition. This is of marked economic importance as the instruments of the present invention can be built into existing machines in a steel mill and can even be portable or semi-portable. The flexibility and versatility are important advantages of the present invention.

FIGS. 1–3 have illustrated situations where the material to be measured is moving either horizontally or nearly so in FIG. 3. Under these relatively favorable conditions, a thin plate with heaters for temperature sensors is adequate because there is no significant blast of air between the surfaces and therefore there is but little, if any, cooling of the surface 2, and hence it is at substantially the same temperature as the plate itself.

Where these favorable environmental conditions occur, as they usually do in most plastic sheet operations, the simplified form of instrument shown in FIGS. 1–3 may be used and is, of course, preferred from a cost standpoint.

FIGS. 4–7 represent situations where the surface temperature of the plate may not be sufficiently close to that of the plate itself so that the latter can be used as in the case of FIGS. 1–3. Such a situation occurs, for example, in certain tinplate mills where it is decided to measure the temperature of the plate when it is moving in a vertical direction. The plate is very hot and a thermal draft between the tinplate and the reference plate establishes itself. Under such circumstances the temperature of the surface of the plate may be substantially below that of the body of the plate itself and of course it is the surface temperature, and that only, which enters into the measurement by instruments of the present invention.

FIGS. 4–7 illustrate a modification and control circuits therefor. In this modification a plate 2 is provided with a central depressed opening 9 under which a capsule 10 is supported from thermally insulating supports 11. The capsule 10 contains a thermopile of the same design as in FIGS. 1–3. The capsule is maintained at a definite temperature by means of heater 12, a temperature sensing element 13 and a control 16 shown in the simplified bridge circuit of FIG. 6. Four thermistors 15 are mounted in the surface of the plate 2 around the central opening 9 and are connected in series parallel as is shown in FIG. 7. In FIG. 5 the wires from the thermistors 13 and 14 and wires to the heaters 12 all lead to a connector 18. The bridge circuit of FIG. 7 which has the thermistor 14 in one arm and the series parallel arrangement of thermistors 15 in another arm feeds a control 22. In the case of both FIGS. 6 and 7 the bridge output is amplified as shown schematically at 23 for both the controllers 16 and 22. Controller 22 also has wires to heaters 20 which are attached in recesses in the plate 2. The latter is also attached to a relatively heavy mass of metal 17 surrounded by a heat insulating layer 19.

Potentiometer 24 of the bridge in FIG. 6 is set for a particular temperature for the capsule 10 which also determines the temperature of the reference junctions 7 of the thermopile and maintains this temperature by means of the controller 16 of FIG. 6.

Thermistor 14 is also mounted on the capsule 10 and the bridge of FIG. 7 maintains the surfaces of the plate 2 at the same temperature by varying operation of the heaters 20 from the controller 22.

It will be seen that the capsule and hence the reference junctions 7 of the thermopile determine the temperature of the surface of the plate 2 around the opening 9. This temperature is not necessarily that of the mass of the plate 2 or of its larger heat mass 17 which temperatures normally will be higher depending on the amount of cooling of the surface of the plate 2. Thus, it will be seen that even with considerable cooling the surface of the plate 2 is maintained at the same temperature as that of the reference junctions of the thermopile and so the more elaborate modification illustrated in FIGS. 4–7 can be used under more adverse circumstances where considerable cooling of the surface of the plate 2 may take place.

FIG. 8 illustrates a different modification in which the surface of the plate 2 radiates to a radiometer 21 which measures its surface temperature directly without being concerned with the temperature in other parts through the thickness of the plate. This modification while useful is not quite as precise as that shown in FIGS. 4–7, the latter being a preferred modification.

In the instrument of FIGS. 4–7 it will be apparent that it is the surface temperature only which is controlled. The instrument is not in the least concerned with the actual temperature of the plate, which will normally be substantially higher. In the case of environments with strong drafts the temperature of the plate may be a number of degrees higher. This is, however, of no interest to the operation of the instrument, because it is only the surface of the plate which enters into the measurement. The more precise instrument of FIGS. 4–7 may, of course, also be used even for measurements under favorable conditions such as those illustrated in FIGS. 1–3 where a simpler instrument could be employed. The choice of which instrument to use is one of economics, balancing somewhat higher cost against the capability of operating in unfavorable environments. FIGS. 4–7 do not represent an extremely expensive modification, but it is still more costly than the instrument of FIGS. 1–3. Therefore, if an instrument is to be used always under a favorable environment, sometimes the cheaper instrument of FIGS. 1–3 will be found preferable. However, the difference in cost is not so great but that it is sometimes preferable to manufacture only one type, which could be that of FIGS. 4–7, because of savings obtainable with higher volume production. The extreme flexibility of the present invention is a valuable practical advantage.

Temperature sensing elements embedded in the surface of the plate have been described in connection with FIGS. 4–7. It is also possible, and in some unusual cases preferable, to measure surface temperature of the plate radiometrically. This is illustrated in FIG. 8, where a total radiation radiometer 21 is shown. The output of this radiometer is led to the controller 22 and it performs the same function as the temperature-sensing elements 14 and 15 in FIGS. 4–7. It should be noted that the radiometer is not subject to the disadvantages of the total radiation radiometer in the Gray patent because questions of emissivity do not enter in, for the plate surface has a fixed emissivity which does not change.

Where it is desired to obtain measurements of the varying emissivity of the material to be measured, this can be done by comparing readings of a conventional total radiation radiometer which views only the surface of which the temperature is to be measured with the temperature of the reference surface when the output measurement of the instrument of the present invention shows that the temperature of the surface to be measured is the same as that of the reference plate surface. This does not form a part of the present invention, because there is now needed direct combination of such a total radiation pyrometer with the elements of the present instrument. It is therefore neither claimed nor illustrated, but is mentioned only to show the versatility and flexibility of the instrument of the present invention.

I claim:

1. In an instrument for determining the temperature of a material to be measured as compared to the temperature of an extended reference plate which has linear dimensions large in comparison to the spacing between the plate and the material to be measured, the improvement which comprises:

(a) a reference plate having dimensions at least an order of magnitude greater than the spacing from the material the temperature of which is to be measured, (b) heating means for maintaining the surface of the reference plate at a predetermined temperature, (c) temperature sensing means embedded in the surface of the reference plate, said sensing means controlling the operation of the heating means, (d) a differential radiation detector having elements exposed to radiation and reference elements shielded therefrom, said differential detector being substantially centrally located in the reference plate, (e) means for maintaining the reference elements of the differential detector at reference plate surface temperature whereby the elements of the detector receiving radiation from the material the temperature of which is to be measured produces a differential signal which is zero when the temperature of the surface to be measured is the same as that of the surface of the reference plate, and (f) electronic processing means for the differential detector output producing a signal which is a function of temperature difference between the reference plate surface and the surface to be measured.

2. An instrument according to claim 1 in which the differential radiation detector is a thermopile and in which the reference junctions of the thermopile are thermally insulated from the plate and are provided with heating means and means controlled by the temperature sensing means embedded in the surface of the plate for maintaining the temperature of the reference junctions of the thermopile at reference plate surface temperature.

References Cited by the Examiner
UNITED STATES PATENTS

| | | |
|---|---|---|
| 2,611,541 | 9/1952 | Gray. |
| 2,690,078 | 9/1954 | Phillips _____ 73—355 |
| 2,785,860 | 3/1957 | Harrison et al. _____ 73—355 X |
| 2,837,917 | 6/1958 | Machler _____ 73—355 |

LOUIS R. PRINCE, *Primary Examiner.*

STEVEN H. BAZERMAN, *Assistant Examiner.*